United States Patent [19]

Overpeck et al.

[11] 4,442,793

[45] Apr. 17, 1984

[54] EASY-TO-CLEAN BIRDHOUSE

[76] Inventors: Charles D. Overpeck; Dorothy S. Overpeck; George G. Overpeck, all of 725 Forest Ridge Dr., Great Falls, Va. 22066

[21] Appl. No.: 396,725

[22] Filed: Jul. 9, 1982

[51] Int. Cl.³ .............................. A01K 31/00
[52] U.S. Cl. ......................... 119/23; 220/331
[58] Field of Search ............. 119/23, 17, 18; 220/331, 334

[56] References Cited

U.S. PATENT DOCUMENTS

| 391,145 | 10/1888 | Hardin | 220/331 |
| 1,329,104 | 1/1920 | Ballin | 119/23 |
| 1,748,349 | 2/1930 | Ijams | 119/23 |
| 2,312,551 | 3/1943 | Hoskins | 119/23 |

FOREIGN PATENT DOCUMENTS

| 658678 | 4/1938 | Fed. Rep. of Germany | 119/23 |
| 681761 | 9/1939 | Fed. Rep. of Germany | 119/23 |

Primary Examiner—J. N. Eskovitz
Attorney, Agent, or Firm—Diller, Ramik & Wight

[57] ABSTRACT

This disclosure relates to an easy-to-clean birdhouse which includes a body defining a chamber closed at one end by a roof and at a lower end by a floor upon which a nest can be built, the floor being normally disposed horizontally and being mounted for either pivoting or sliding or a combination of pivoting and sliding motions whereby a nest can be removed through the bottom of the birdhouse, the floor being preferably maintained in its position of use by a flexible wire passing beneath the underside of the floor and through aligned openings in the birdhouse body, and ends of the wire or rod being bent to preclude the rod from being accidentally withdrawn from its associated openings yet permitting the intentional rebending of the rod and its subsequent removal from the openings to permit the floor to open whereby nests can be removed from the birdhouse chamber.

2 Claims, 6 Drawing Figures

EASY-TO-CLEAN BIRDHOUSE

Bird watching has become a leisure time activity for young and old, and over the past recent years interest therein has grown appreciably. Commercial bird feeders, birdhouses and the like are commonplace and there use is generally designed to attract birds and desired species of birds to areas where the birds can be readily, though unobtrusively viewed. Thus, birdhouses, bird feeders and the like are generally positiionted out-of-doors where they will attract birds in close proximity to windows so that persons viewing the birds can do so while in the comfort of their home, apartment or the like.

Many person, particular old, infirmed, disabled, etc., have few activites which lend themselves to their infirmities and, therefore, bird watching stems as an activity which can provide optimum benefits at minimum effort. However, in such cases where birdhouses are utilized to attract birds, it is necessary that the nest which is utilized and then abandoned during migration is removed from the birdhouse to, in effect, condition the birdhouse for its next occupant. For example, bluebirds are such migratory birds which will establish nests in the Southeastern, Middle Atlantic and New England states, raise and rear their young, and then migrate southward as winter approaches. Any such nests must be removed, otherwise upon the return of the bluebirds the next year, they will not reoccupy a birdhouse having an old nest therein. Obviously, removing old nests can crete problems, particularly among the aged, physically infirmed, etc., and it is particularly in regard to the latter individuals that the present birdhouse has been constructed and particularly includes a bottom wall or floor which can be maintained in a position of use but can be readily and quickly moved to a position providing access to the birdhouse interior to remove therefrom an associated nest and, thus, condition the birdhouse for its next occupant.

Birdhouses have heretofore been constructed to permit the removal of an old nest as, for example, U.S. Pat. No. 1,748,349 issued to Harry B. Ijams on Feb. 25, 1930, for a bird box which is "occupied by birds for laying their eggs and hatching and feeding their young, the box being built and formed to be attached to the walls of buildings or to the trunks of trees or to columns or posts." The same bird box includes "an upper section and a lower section, the lower section being removable for cleaning and for observing and studying the eggs and young birds and to afford opportunity to band young birds." While this patent discloses a two-part bird box formed of telescopically united upper and lower sections, the two sections are united in a precarious manner and though they can be readily disassembled, they also can be accidentally or inadvertently disassembled through wind, bird activity within or upon the bird box.

In the patent to A. H. Stone issued Apr. 30, 1963 and identified by U.S. Pat. No. 3,087,460 there is disclosed another "birdhouse or feeding station" in which a roof portion and its associated lower nesting box part are assembled and disassembled by a sliding action, or in another embodiment by a pivoting action to open the roof with the pin being utilized in aligned openings of the roof and nesting box part to prevent the roof from being opened. The disadvantage of this type of birdhouse is the difficulty for elderly and infirmed to align holes associated with the pivoted roof and the lower nesting box part and then place the pin therein. Furthermore, pivoting the roof to open the same creates a difficulty since the nest which is to be removed must be removed from the top, rather than from the bottom.

Another example of a bird cage, not a birdhouse, which utilizes a pivoted bottom wall can be found in U.S. Pat. No. 1,605,246 issued on Nov. 2, 1926 in the name of L. Leon. However, in this case, alignment between apertures and pins must be utilized to lock the bottom relative to the bird cage, and this again is a task generally found difficult to accomplish by the elderly and the imfirmed.

In keeping with the present invention, the easy-to-clean birdhouse of this disclosure is designed primarily to permit a bottom wall to be rapidly removed and replaced to remove a nest from the birdhouse nesting chamber and to accomplish this rapidly and efficiently, particularly by the elderly and infirmed.

In furtherance of the latter-noted object, the easy-to-clean birdhouse includes a floor closing a lower end portion of the birdhouse body and its associated chamber, and a rod of flexible material spans and underlyingly supports the floor with a rod passing through opposite openings in the body lower end portion with axial opposite ends of the rod being bent out of the normal rod axis to prevent the accidental withdrawal of the rod from the openings while permitting the elderly, aged, and infirmed to rebend the rod ends to permit the intentional withdrawal of the rod from the openings and the subsequent opening of the floor whereby nests can be removed, the floor replaced, and the rod reinserted to its locked or bent condition.

In further accordance with this invention, the easy-to-clean birdhouse includes means for pivotally connecting the floor to the lower end of the birdhouse body or means for providing both a pivotal and slidable connection between the floor and the birdhouse body lower end portion whereby upon the withdrawal of the rod, the floor can be opened by purely a pivoting motion or by a compound pivoting/sliding motion.

With the above and other objects in view that will hereinafter appear, the nature of the invention will be more clearly understood by reference to the following detailed description, the appended claims and the several views illustrated in the accompany drawings.

IN THE DRAWINGS

Figure 1:
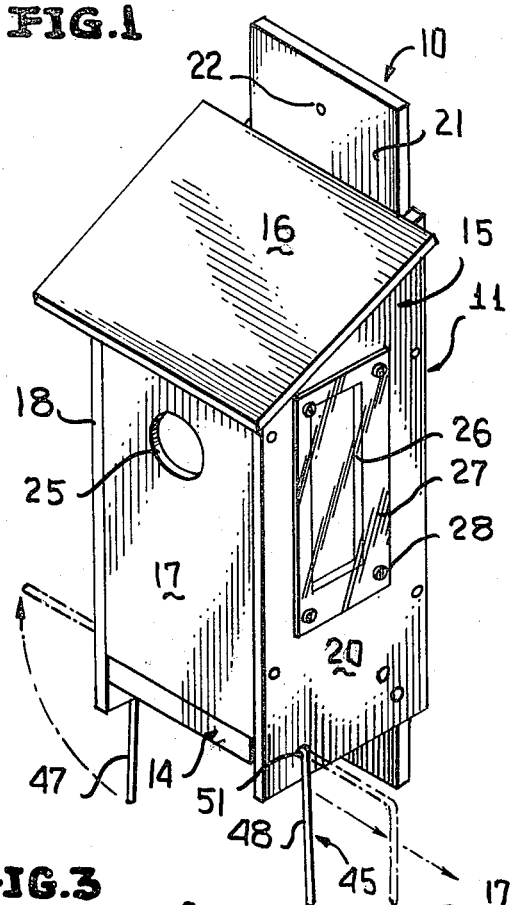
FIG. 1 is a perspective view of a novel easy-to-clean birdhouse constructed in accordance with this invention, and illustrates an opening for bird egress and ingress into a chamber of the birdhouse which is normally closed by a bottom wall maintained in a generally horizontal position by a rod passing beneath the bottom wall and through aligned openings in side walls of the birdhouse.

A novel easy-to-clean birdhouse constructed in accordance with this invention is generally designated by the reference numeral 10 and includes a body 11 (FIGS. 1 and 2) defining an interior chamber 12 having a normally opened lower end portion 13 (FIGS. 3 and 4) closed by a bottom wall or floor 14 and an upper end portion 15 (FIGS. 1 and 2) closed by an upper wall or roof 16.

The birdhouse body 11 is defined by a plurality of walls including a front wall 17, parallel side walls 18, 20 and a rear wall 21 having an upper opening 22 and a lower opening 23 (FIG. 2) through which nails or like fastening devices may pass for securing the birdhouse 10 to a tree or like support.

The front wall 17 includes a circular opening 25 through which a bird, such as a bluebird, may utilize for ingress or egress relative to the chamber 12 to build a nest therein upon the bottom wall or floor 14 and subsequently lay eggs, raise young, etc. The latter activities may, of course, be viewed through a generally rectangular access opening or window 26 covered by a transparent sheet of plastic material 27 fastened to the wall 20 by means of conventional screws 28. The window 27 is, of course, formed in the wall 20 and is so positioned that the upper portion of the nest, the nest interior, and any eggs or birds within the vicinity can be viewed very readily through the transparent plastic 27.

The various walls 14, 16, 17, 18, 20 and 21 are preferably constructed from wood, such as conventional one-quarter inch or one-half inch plywood, although plastic or composite materials might as well be utilized. However, in the case of wood, the various latter-noted walls are preferably secured together by nails which are shown, though unnumbered, in FIGS. 1 and 2. All of the latter-noted walls are, therefore, united to each other in a very rigid fashion, and the only movable and/or removable wall is the wall or floor 14.

Figure 2:
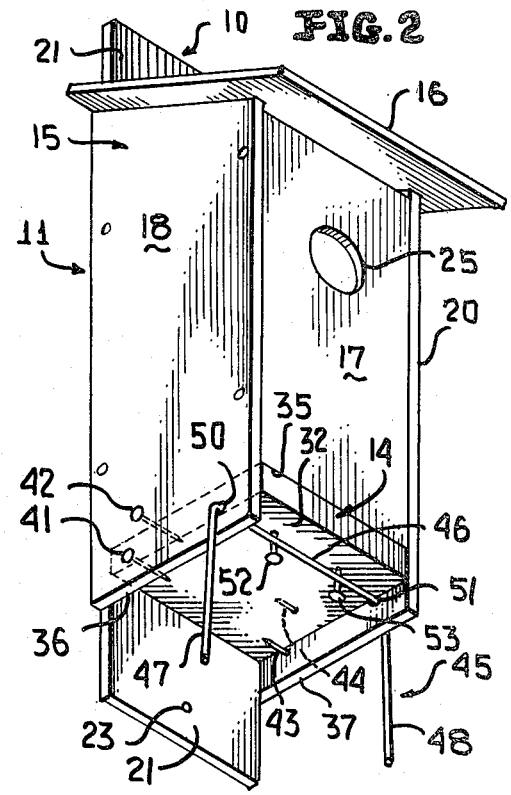
FIG. 2 is a bottom perspective view of the birdhouse of FIG. 1, and illustrates details of the bottom wall including the position of the rod relative to the bottom wall or floor of the birdhouse.
Figure 3:
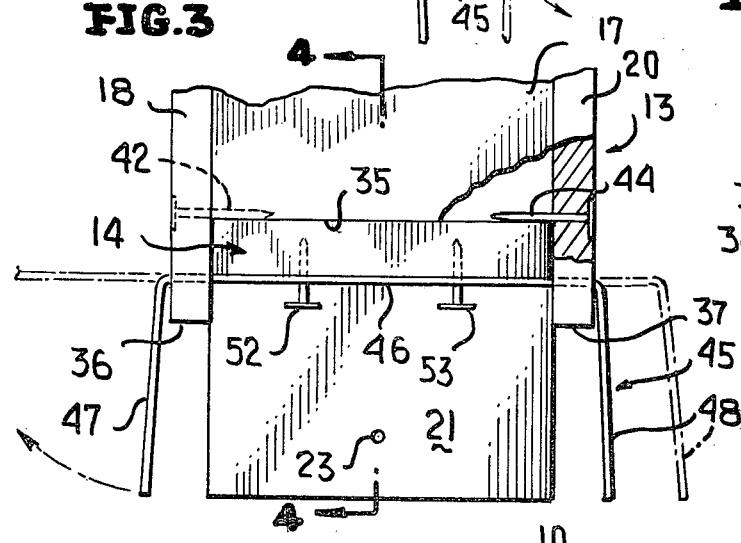
FIG. 3 is a fragmentary enlarged front elevational view of the birdhouse, and illustrates the manner in which a central portion of the rod underlies the bottom wall or floor and two nails which prevent the floor from being withdrawn unless at least one end of the rod is rebent to permit the rod from being withdrawn through aligned openings.
Figure 4:
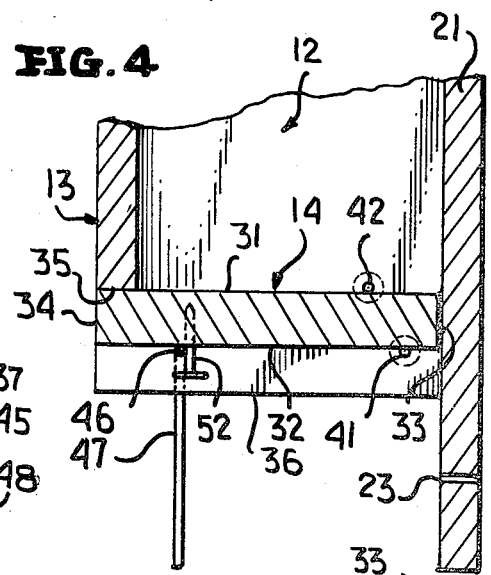
FIG. 4 is a fragmentary sectional view generally along line 4—4 of FIG. 3, and illustrates the manner in which one of the nails contacts a mid portion of the rod to prevent the floor from being withdrawn from between a pair of nails forming a pivotal/sliding connection between the floor and the side walls of the birdhouse.

Reference is now made specifically to FIGS. 3 and 4 which more specifically illustrate the manner in which the wall or floor 14 is removably associated to the bottom end portion 13 of the birdhouse body 11. The bottom wall 14 includes an upper surface 31, a lower surface 32, a rearmost edge 33, and a forwardmost edge 34. The uppermost surface 31 normally contacts a lowermost edge 35 of the front wall 17 while the edge 33 normally abuts an inner surface (unnumbered) of the rear wall 21 (FIG. 4) when the floor 14 occupies its normal in-use horizontal position (FIGS. 3 and 4). The front edge 34 is generally flush with a front surface (unnumbered) of the front wall 17 and the lowermost surface 32 of the floor 14 is slightly above lowermost edges 36, 37 (FIG. 2) of the respective walls 18, 20. A pair of nails 41, 42 are driven through the wall 18, while a pair of nails 43, 44 are driven through the wall 20 with the distance between the nails 41, 42 and 43, 44 corresponding generally to the distance between the surfaces 31, 32 of the floor 14. Thus, the edge portion of the floor 14 nearest adjacent the edge 33 can be positioned in the area between the nails 41, 42; 43, 44, as is best indicated in FIG. 4, and the lowermost nails 41, 43 serve as underside supports for the floor 14 adjacent the rear wall 21.

Figure 5:
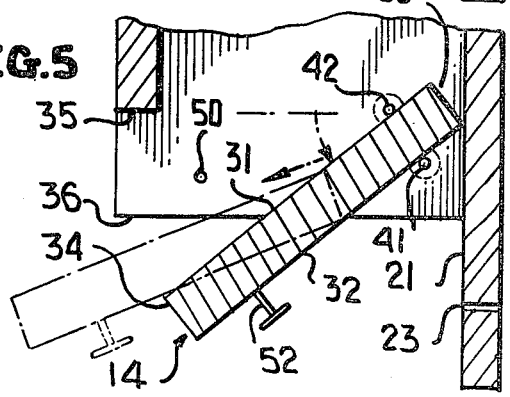
FIG. 5 is a fragmentary sectional view similar to FIG. 4, and illustrates in solid outline the manner in which the floor is initially moved to a position after the rod has been withdrawn from the openings and in the phantom outline position the manner in which the floor can be totally withdrawn to expose the chamber of the birdhouse from beneath.

The forwardmost end portion (unnumbered) of the floor 14 adjacent the front wall 17 is supported by means 45 in the form of a rod formed of readily bent, ductile, flexible material with the rod 45 having a medial portion 46 and opposite ends or end portions 47, 48. The rod is normally straight and is passed through oversized openings 50, 51 in the respective side walls 18, 20 with the medial portion 46 thereof resting against the surface 42 and, thus, underlyingly supporting the floor 14 adjacent the front wall 17 (FIG. 2). With the end portions 47, 48 of the rod 45 bend downwardly, as is best shown in FIG. 2 and in solid outline in FIG. 3, the floor 14 can not move downwardly and two nails 52, 53 driven upwardly into the floor 14 in the manner most apparent from FIGS. 3 and 4 prevent the floor 14 from being slid forwardly and outwardly from between the pairs of nails 41, 42 and 43, 44, as is most readily apparent from FIG. 4, simply because the nails 52, 53 abut the medial portion 46 of the rod 45. Therefore, with the ends of the rods 47, 48 bend downwardly as shown in solid lines in FIG. 3, the floor 14 is securely held in the position of use and a nest can be built thereupon in confidence without fear of the floor 14 being inadvertently or accidentally dislodged from its in-use position. However, should nesting birds subsequently leave the birdhouse 10 due to winter migration, for example, and a person desires to remove the nest from the chamber 12 to condition the same for subsequent reuse, the soft ductile flexible end or ends 47, 48 of the rod 45 are bent (one or both) and the rod 45 is simply withdrawn from the openings 50, 51 after which the compound pivoting (FIG. 5) motions shown in solid outline followed by the sliding withdrawal shown in phantom outline of the floor 14 from between the pairs of nails 41, 42 and 43, 44 permits the bottom-removal of any nest which might be within the chamber 12. This can be done easily by persons aged, infirmed, or the like, and once the nest is completed, the floor 14 can be easily replaced between the pairs of nails 41, 42 and 43, 44 which it should be noted are offset to form therebetween a space appreciably greater than the normal distance between the surfaces 31, 32. Therefore, it is relatively easy to position the floor 14 between the oversized distance between the pairs of nails 41, 42; 43, 44 and thereafter reposition the rod 45 in the oversized holes 50, 51. Furthermore, the rod 45 is not aligned with any immediately adjacent holes or bores in the floor 14, and one need but first put the rod through the oversized hole 50, for example, or 51 and then thread the rod through the remaining opening 50 or 51 which can be readily accomplished by simply manipulating the readily bendable material of the rod to effect insertion of either of the ends 47, 48 in any of the holes 50, 51. These tasks can be performed with ease by persons of advanced age who would otherwise have difficulties in performing seemingly routine and/or simple operations. Once the ends 47, 48 of the rod 45 are again rebent generally transverse or normal to the medial portion 46, the floor 14 is accurately positioned in its position of use by the nails 52, 53 contacting the medial portion 46 of the rod 45, and the same latter-noted elements preclude the withdrawal of the floor 14 as was latter-noted in the absence of the withdrawal of the rod 45 from the openings 50, 51. In this manner, a novel easy-to-clean birdhouse 10 is provided which accomplishes in an efficient and simple manner the advantages heretofore noted.

Figure 6:
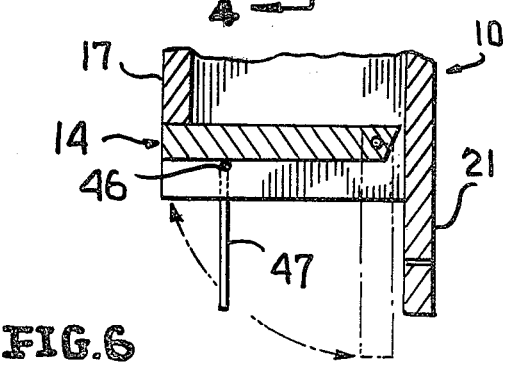
FIG. 6 is a modified form of the invention, and illustrates an easy-to-clean birdhouse wherein the bottom wall or floor is connected by pivot pins to the side wall of the birdhouse.

A modified version of the easy-to-clean birdhouse described relative to FIGS. 1 through 5 is shown in FIG. 6 and like components bear the same though primed reference numerals. However, in lieu of utilizing the pairs of nails 41, 42 and 43, 44 of the birdhouse 10, the birdhouse 10' of FIG. 6 uses opposite pivot pins 60, only one of which is shown, for pivotally connecting a bottom wall or floor 14' to the associated side walls of the birdhouse 10'. In this case, when the rod 45' is withdrawn, the floor 14' simply pivots to the phantom outline position for cleaning purposes, as compared to the compound motion of the pivoting and sliding of the floor 14 relative to the pairs of nails 41, 42 and 43, 44 of the birdhouse 10.

Although only a preferred embodiment of the invention has been specifically illustrated and described herein, it is to be understood that minor variations may be made in the apparatus without departing from the spirit and scope of the invention, as defined in the appended claims.

What is claimed is:

1. An easy-to-clean birdhouse comprising a body defining a chamber, a roof closing an upper end portion of said body and said chamber, a floor closing a lower end portion of said body and said chamber, means in said body for defining a bird ingress and egress opening relative to said chamber whereby birds might build a nest within said chamber upon said floor, means for normally maintaining said floor normal to a longitudinal axis of said chamber whereby said floor is normally disposed essentially horizontally when said birdhouse is appropriately supported in its use position, said maintaining means including a rod of flexible material spanning and underlyingly supporting said floor, said rod passing through opposite openings in said body lower end portion, at least one end of said rod being bent transversely to the rod axis to prevent the accidental withdrawal of said rod from said openings but said one rod end being capable of being rebent into realignment with the rod axis to permit the intentional withdrawal of said rod from said openings and the subsequent opening of said floor whereby a nest can be removed through said opened lower end portion, means for pivotally/slidably connecting said floor to said body lower end portion whereby upon the withdrawal of said rod said floor can pivot and/or slide to open said chamber lower end portion, and said pivotally/slidably connecting means are two pairs of spaced pins at opposite sides of said body lower end portion each receiving therebetween a lateral edge of said floor.

2. The easy-to-clean birdhouse as defined in claim 1 wherein said rod includes another end opposite said one end of said rod, and said another rod end is bent transversely to the rod axis to prevent the accidental withdrawal of said rod from said openings but said another rod end is capable of being rebent into realignment with the rod axis to permit the intentional withdrawal of said rod from said openings and the subsequent opening of said floor.

* * * * *